(12) United States Patent
Park et al.

(10) Patent No.: US 10,642,310 B2
(45) Date of Patent: May 5, 2020

(54) SMART DEVICE FOR DISPLAYING SEAMLESS IMAGES, CONTROL METHOD THEREFOR, AND RECORDING MEDIUM FOR IMPLEMENTING METHOD

(71) Applicant: KOREA INSTITUTE OF SCIENCE AND TECHNOLOGY, Seoul (KR)

(72) Inventors: Ji Hyung Park, Seoul (KR); Hyo Young Kim, Seoul (KR); Bo Kyung Hur, Seoul (KR); Heesun Kim, Gunpo-si (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 16/079,822

(22) PCT Filed: Feb. 23, 2017

(86) PCT No.: PCT/KR2017/001971
§ 371 (c)(1),
(2) Date: Aug. 24, 2018

(87) PCT Pub. No.: WO2017/146471
PCT Pub. Date: Aug. 31, 2017

(65) Prior Publication Data
US 2019/0086952 A1    Mar. 21, 2019

(30) Foreign Application Priority Data
Feb. 25, 2016    (KR) ........................ 10-2016-0022471

(51) Int. Cl.
*G06F 1/16*    (2006.01)
*G06K 19/02*    (2006.01)
(Continued)

(52) U.S. Cl.
CPC .............. *G06F 1/163* (2013.01); *A44C 5/107* (2013.01); *G06F 1/1652* (2013.01);
(Continued)

(58) Field of Classification Search
CPC combination set(s) only.
See application file for complete search history.

(56) References Cited

U.S. PATENT DOCUMENTS

2012/0092363 A1    4/2012    Kim et al.
2012/0329528 A1    12/2012    Song
(Continued)

FOREIGN PATENT DOCUMENTS

KR    10-2006-0096170 A    9/2006
KR    10-2012-0038334 A    4/2012
(Continued)

*Primary Examiner* — Deeprose Subedi
(74) *Attorney, Agent, or Firm* — Rabin & Berdo, P.C.

(57) ABSTRACT

A sleeve type smart device comprises: a cylindrical flexible display panel which displays seamless continuous images on an outer surface thereof, and has a sleeve-shaped form of which the inside is empty; a sensing unit located at an inner surface of the flexible display panel so as to recognize an entity located inside the flexible display panel; a mode selection unit for automatically selecting an operation mode corresponding to the recognized entity; and a control unit for controlling so as to operate in the operation mode selected by the mode selection unit. Accordingly, the implementation of the seamless images is possible and one device could be used in various ways according to an installation state.

13 Claims, 9 Drawing Sheets

(51) Int. Cl.
　　　*G09F 9/30*　　　　(2006.01)
　　　*G09F 21/02*　　　(2006.01)
　　　*G06F 3/01*　　　　(2006.01)
　　　*H04R 1/02*　　　　(2006.01)
　　　*G06F 3/0485*　　　(2013.01)
　　　*A44C 5/10*　　　　(2006.01)
　　　*A47G 23/03*　　　(2006.01)
　　　*A47G 23/02*　　　(2006.01)

(52) U.S. Cl.
　　　CPC ............ *G06F 1/1694* (2013.01); *G06F 3/017* (2013.01); *G06F 3/0485* (2013.01); *G06K 19/025* (2013.01); *G09F 9/301* (2013.01); *G09F 21/02* (2013.01); *H04R 1/028* (2013.01); *A47G 23/0306* (2013.01); *A47G 2023/0291* (2013.01)

(56) References Cited

U.S. PATENT DOCUMENTS

| | | |
|---|---|---|
| 2014/0063046 A1 | 3/2014 | Jung et al. |
| 2014/0139422 A1 | 5/2014 | Mistry et al. |
| 2014/0300557 A1 | 10/2014 | Cho et al. |
| 2014/0313176 A1 | 10/2014 | Kim et al. |
| 2014/0347289 A1 | 11/2014 | Suh et al. |
| 2015/0003210 A1 | 1/2015 | Joung et al. |
| 2015/0085621 A1 | 3/2015 | Hong et al. |
| 2015/0205994 A1 | 7/2015 | Yoo et al. |
| 2015/0227245 A1* | 8/2015 | Inagaki ............... G06F 3/0412 345/173 |
| 2016/0112667 A1 | 4/2016 | Park et al. |
| 2017/0018248 A1 | 1/2017 | Na |

FOREIGN PATENT DOCUMENTS

| | | |
|---|---|---|
| KR | 10-2012-0093148 A | 8/2012 |
| KR | 10-2013-0006757 A | 1/2013 |
| KR | 10-2014-0029874 A | 3/2014 |
| KR | 10-2014-0034578 A | 3/2014 |
| KR | 10-2014-0064694 A | 5/2014 |
| KR | 10-2014-0112756 A | 9/2014 |
| KR | 10-2014-0120470 A | 10/2014 |
| KR | 10-2014-0122155 A | 10/2014 |
| KR | 10-2014-0125182 A | 10/2014 |
| KR | 10-2014-0137170 A | 12/2014 |
| KR | 10-2014-0144029 A | 12/2014 |
| KR | 10-2015-0009529 A | 1/2015 |
| KR | 10-2015-0033902 A | 4/2015 |
| KR | 10-2015-0045863 A | 4/2015 |
| KR | 10-2015-0103927 A | 9/2015 |
| WO | WO 2000/025193 A2 | 5/2000 |
| WO | WO 2011/005318 A2 | 1/2011 |
| WO | WO 2013/148596 A2 | 10/2013 |
| WO | WO 2014/142382 A1 | 9/2014 |

\* cited by examiner

| | | Changing Content | | | | | | |
|---|---|---|---|---|---|---|---|---|
| Switching Mode | ... | Content 9 | Content 10 | Mode 1 | Content 1 | Content 2 | Content 3 | ... |
| | ... | Content 9 | Content 10 | Mode 2 | Content 1 | Content 2 | Content 3 | ... |
| | ... | Content 9 | Content 10 | Mode 3 | Content 1 | Content 2 | Content 3 | ... |
| | ... | Content 9 | Content 10 | Mode 4 | Content 1 | Content 2 | Content 3 | ... |

FIG. 10

| Function | In-hand Motion | Description |
|---|---|---|
| Locking Display |  | Lifting up and putting down |
| Unlocking Display |  | Shaking up and down |
| Changing Mode |  | Tilting up/ down |
| Navigating Content |  | Turning right/ left |

SMART DEVICE FOR DISPLAYING SEAMLESS IMAGES, CONTROL METHOD THEREFOR, AND RECORDING MEDIUM FOR IMPLEMENTING METHOD

TECHNICAL FIELD

The present disclosure relates to a sleeve type smart device for displaying seamless images, a control method therefor and a recording medium for implementing the method, and more particularly, to a band type display device based on flexible display technology and a sleeve type smart device that can be used while mounted on a user's wrist and a cylindrical object.

DESCRIPTION OF GOVERNMENT-SPONSORED RESEARCH AND DEVELOPMENT

This research is sponsored by Ministry of Culture, Sports and Tourism, Culture Technology Research and Development (Development of UI/UX and contents generation tool for small flexible display, Project Serial No.: APP0120150625001) under the management of Korea Institute of Science and Technology.

BACKGROUND ART

With the development of electronic technology, various types of display devices are developed, and particularly, mobile display devices such as TVs, PCs, laptop computers, tablet PCs, mobile phones and MP3 players are widely spread. Recently, to meet the demands of users who want newer and various functions, efforts have been made to develop newer types of display devices. This is so-called next-generation display.

An example of next-generation display devices is a flexible display device. The flexible display device is a display device having a property that can change the shape as if it is a paper, and is customer-oriented future display technology that enables search and acquisition of desired information anytime anywhere.

The flexible display device can deform when a user bends it by applying a force, and thus it can be used in various applications. For example, the flexible display device may be implemented as a mobile device such as a mobile phone or a tablet PC, a digital photo album, a PDA and an MP3 player. Accordingly, there are demands for various display provision and new interface using the deformation property of the flexible display device.

Meanwhile, with the emergence and vast development of wearable computing, human activity monitoring becomes ubiquitous in medical devices and smartphones. People collect activity logs and see their conditions, media tasks or places, and use physical wearable sensors to record their activities on social network services.

Recently, various sensors and devices with small size and light weight are on the market, and smartphones have various embedded sensors and mobile applications for tracking personal activities. With the widespread use of mobile applications and wearable devices, there are demands for devices that are convenient to carry with and can perform various functions.

DISCLOSURE

Technical Problem

Therefore, in an effort to address this technical issue, the present disclosure is directed to providing a sleeve type smart device that is implemented in cylindrical shape and can be used in various applications including a wearable device and a smart device.

The present disclosure is further directed to providing a method for controlling a sleeve type smart device that can be used in various applications.

The present disclosure is further directed to providing a recording medium having recorded thereon a computer program for implementing a method for controlling a sleeve type smart device.

Technical Solution

To achieve the above-described object of the present disclosure, a sleeve type smart device according to an embodiment includes a cylindrical flexible display panel which displays seamless continuous images on an outer surface thereof, and has a sleeve-shaped form of which the inside is empty, a sensing unit located at an inner surface of the flexible display panel so as to recognize an entity located inside the flexible display panel, a mode selection unit for automatically selecting an operation mode corresponding to the recognized entity, and a control unit for controlling so as to operate in the operation mode selected by the mode selection unit.

In an embodiment of the present disclosure, the control unit may sense an in-hand motion of the sleeve type smart device in the selected operation mode, and control the sleeve type smart device to perform a function corresponding to the in-hand motion.

In an embodiment of the present disclosure, the control unit may store each operation mode and at least one content that can be executed in each operation mode.

In an embodiment of the present disclosure, the control unit may store at least one content that can be executed in each operation mode and in-hand motions corresponding to each content.

In an embodiment of the present disclosure, the control unit may lock the display on the flexible display panel in response to lifting up and putting down the sleeve type smart device, may unlock the display on the flexible display panel in response to shaking up and down the sleeve type smart device, may switch the operation mode of the sleeve type smart device in response to tilting up and down the sleeve type smart device, and may navigate the content displayed on the flexible display panel in response to turning right and left the sleeve type smart device.

In an embodiment of the present disclosure, the sensing unit may recognize an RFID signal from a tag attached to the entity located inside the flexible display panel, or recognize a human biosignal.

In an embodiment of the present disclosure, the entity located inside the flexible display panel may be one of a tumbler, a cup, a bottle, a stand, a speaker and a human body.

In an embodiment of the present disclosure, the mode selection unit may select a preset operation mode according to the recognized entity.

In an embodiment of the present disclosure, the mode selection unit may select one of a smart watch mode and a health band mode when the recognized entity is a human body.

To achieve the above-described object of the present disclosure, a method for controlling a sleeve type smart device according to another embodiment is a method for controlling a sleeve type smart device which displays seamless continuous images on an outer surface and has a sleeve-shaped form of which the inside is empty, and includes recognizing an entity located inside the sleeve type smart device, automatically selecting an operation mode corresponding to the recognized entity, and controlling the sleeve type smart device to operate in the operation mode selected by the mode selection unit.

In an embodiment of the present disclosure, the controlling the sleeve type smart device may include sensing an in-hand motion of the sleeve type smart device in the selected operation mode, and controlling the sleeve type smart device to perform a function corresponding to the in-hand motion.

In an embodiment of the present disclosure, the controlling the sleeve type smart device may include locking the display on the outer surface in response to lifting up and putting down the sleeve type smart device, unlocking the display on the outer surface in response to shaking up and down the sleeve type smart device, switching the operation mode of the sleeve type smart device in response to tilting up and down the sleeve type smart device, and navigating the content displayed on the outer surface in response to turning right and left the sleeve type smart device.

In an embodiment of the present disclosure, the recognizing the entity located inside the sleeve type smart device may include recognizing an RFID signal from a tag attached to the entity located inside the sleeve type smart device, or recognizing the entity according to a human biosignal.

In an embodiment of the present disclosure, the entity located inside the sleeve type smart device may be one of a tumbler, a cup, a bottle, a stand, a speaker and a human body.

In an embodiment of the present disclosure, the automatically selecting the operation mode corresponding to the recognized entity may include selecting a preset operation mode according to the recognized entity.

In an embodiment of the present disclosure, the automatically selecting the operation mode corresponding to the recognized entity may include selecting one of a smart watch mode and a health band mode when the recognized entity is a human body.

To achieve the above-described another object of the present disclosure, a computer-readable recording medium according to an embodiment has recorded thereon a computer program for implementing the above-described method for controlling a sleeve type smart device.

Advantageous Effects

According to the sleeve type smart device and the control method therefor as described above, a cylindrical flexible display achieves a seamless image, a sleeve type display in the shape of a wide band can be worn on a wrist, and an individual display works as it stands erect on the plane. Additionally, it automatically selects an optimized mode according to the installation state, recognizes a user's in-hand motion and executes various contents in each operation mode, and thus it can be used as a wearable device and a portable smart device.

BEST MODE

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to locations or arrangements of individual elements in each disclosed embodiment without departing from the spirit and scope of the present disclosure. Accordingly, the following detailed description is not intended to be construed in limiting senses, and the scope of the present disclosure is only defined, if appropriately described, by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

Figure 1:
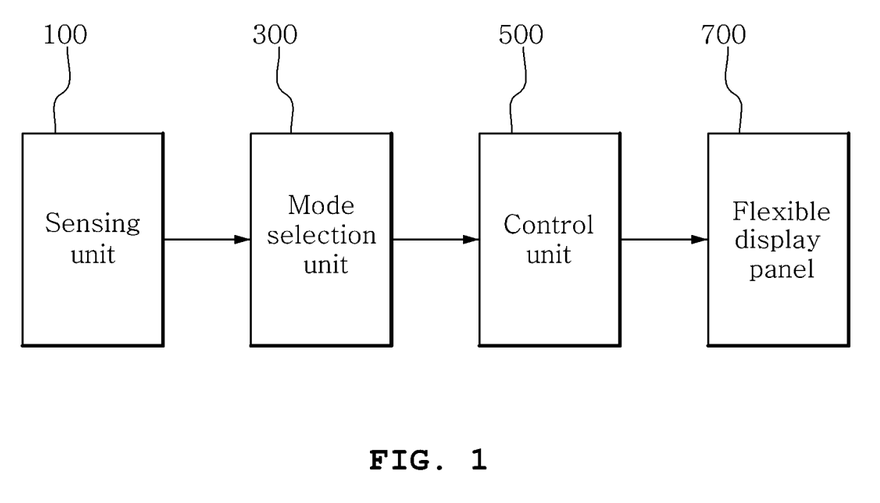
FIG. 1 is a block diagram of a sleeve type smart device for displaying seamless images according to an embodiment of the present disclosure.
Figure 2:
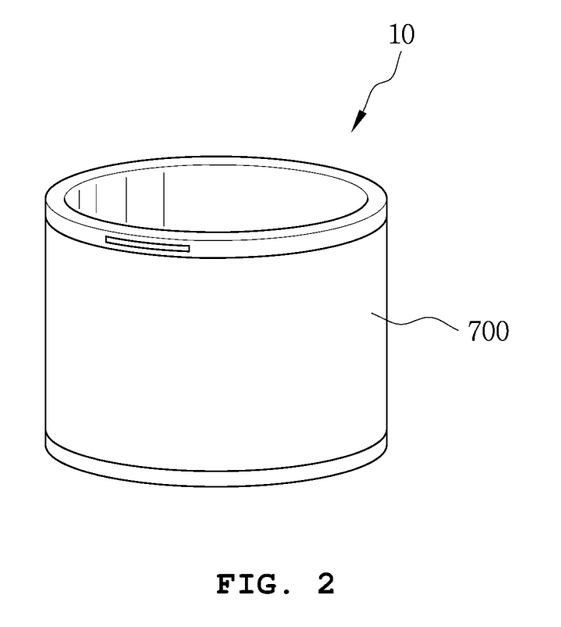
FIG. 2 is a perspective view of the sleeve type smart device of FIG. 1.
Figure 3:
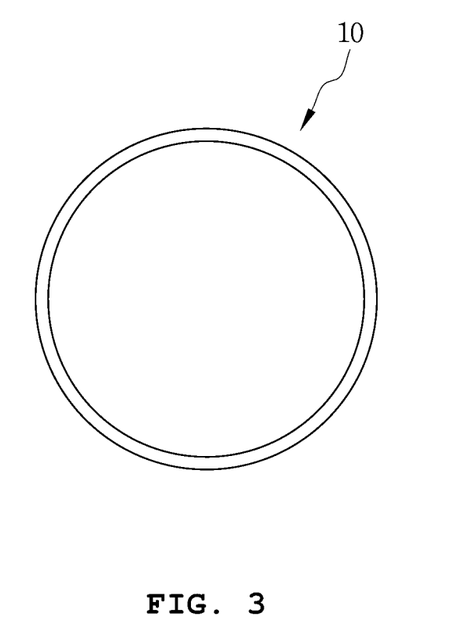
FIG. 3 is a plane view of the sleeve type smart device of FIG. 1.
Figure 4:
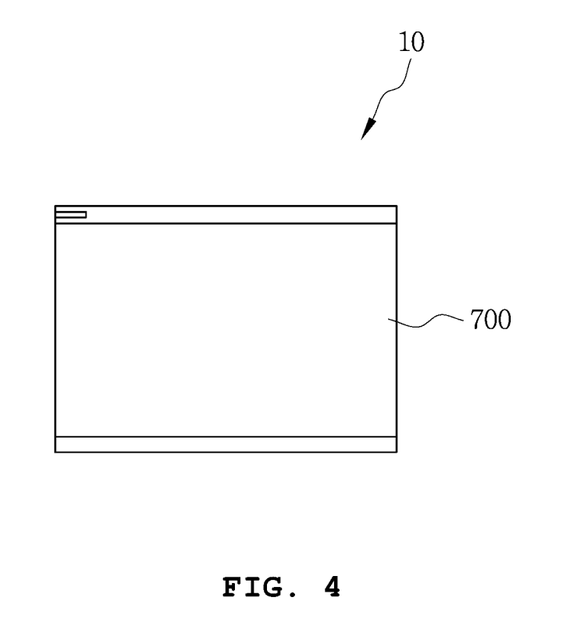
FIG. 4 is a front view of the sleeve type smart device of FIG. 1.

FIG. 1 is a block diagram of a sleeve type smart device for displaying seamless images according to an embodiment of the present disclosure. FIG. 2 is a perspective view of the sleeve type smart device of FIG. 1. FIG. 3 is a plane view of the sleeve type smart device of FIG. 1. FIG. 4 is a front view of the sleeve type smart device of FIG. 1.

The sleeve type smart device 10 (hereinafter, device) according to the present disclosure is a cylindrical small flexible display device with open top and bottom in the shape of a wide bracelet or bangle, and in use, the device 10 may be worn on a human body, for example, a wrist and an ankle, or may be mounted on another device, for example, a tumbler, a cup, a bottle, a stand and a speaker, and the device 10 recognizes an installation state and provides an optimized function that is well suited for each state.

Referring to FIG. 1, the device 10 according to the present disclosure includes a sensing unit 100, a mode selection unit 300, a control unit 500 and a flexible display panel 700.

Referring to FIGS. 2 to 4, the device 10 has a generally hollow sleeve-shaped form of which the inside is empty. As the inside of the device 10 is empty, the device 10 is a portable device that can be used while mounted on another device, for example, a tumbler, a cup, a light stand and a speaker, and is also a wearable device that is worn on a user's wrist.

The device 10 of the present disclosure, on which software (application) for performing functions according to the installation state is installed, may run the software (application), and the components of the sensing unit 100, the mode selection unit 300, the control unit 500 and the flexible display panel 700 may be controlled by the software for performing functions according to the installation state of the device 10.

Additionally, the components of the sensing unit 100, the mode selection unit 300, the control unit 500 and the flexible display panel 700 may be formed into an integrated module, or may be implemented as one or more modules. To the contrary, however, each component may be implemented as a separate module. For example, the sensing unit 100, the mode selection unit 300 and the control unit 500 may be implemented as an FPCB and may be located at the inner surface or inside of the flexible display panel 700.

The device 10 has mobility. The device 10 may be called by a different name, for example, a mobile device, a wearable device, a portable device, a terminal, a user equipment (UE), a mobile station (MS), a mobile terminal (MT), a user terminal (UT), a subscriber station (SS), a wireless device, a wireless modem, a handheld device and an apparatus.

The device 10 may execute or create various types of software based on an operating system (OS). The operating system is a system program for enabling software to use hardware of the device, and may include all mobile computer operating systems including Android OS, iOS, Windows mobile OS, Bada OS, Symbian OS and Blackberry OS.

The flexible display panel 700 has the same form as the device 10, that is, a sleeve-shaped form of which the inside is empty, and displays seamless continuous images on an outer surface thereof.

Figure 5:
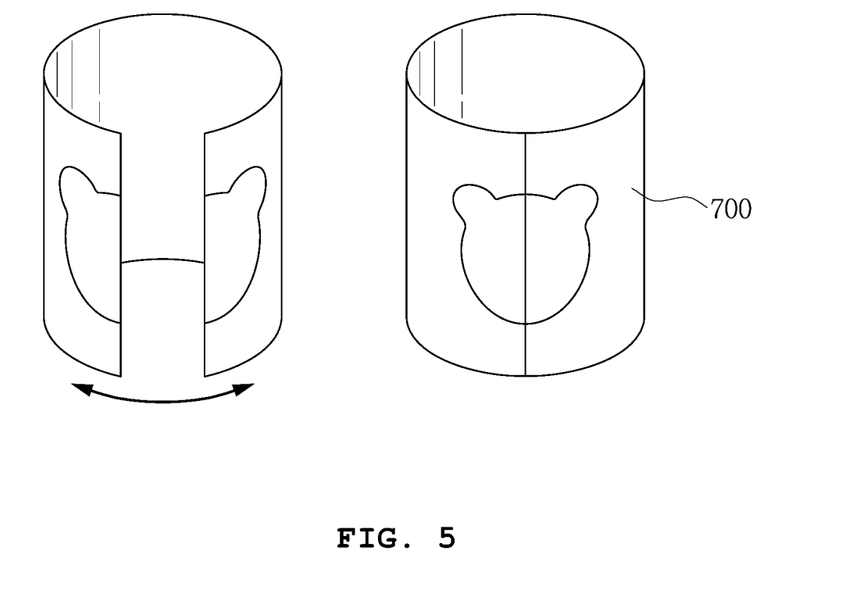
FIG. 5 is a diagram illustrating an image displayed on a flexible display panel of the sleeve type smart device of FIG. 1.

Referring to FIG. 5, the flexible display panel 700 is rolled up into a cylinder such that two ends of the flat panel touch each other, achieving seamless image display. Accordingly, an image can be seen in 360-degree full screen of the flexible display panel 700, and 3D stereoscopic image can be efficiently represented.

The flexible display panel 700 may be implemented as a plastic substrate (e.g., a polymer film) that can be deformed by the external pressure. The plastic substrate has a structure in which a base film is treated with a barrier coating on two surfaces thereof. The base film may be made of various resins including polyimide (PI), polycarbonite (PC), polyethyleneterephtalate (PET), polyethersulfone (PES), polythylenenaphthalate (PEN) and fiber reinforced plastic (FRP). Additionally, the barrier coating is formed on the facing surfaces of the base film, and an organic film or an inorganic film may be used to maintain flexibility.

Meanwhile, the flexible display panel 700 may use the plastic substrate as well as materials having flexible properties such as a thin glass or a metal foil. Alternatively, the flexible display panel 700 may be implemented as an organic light-emitting diode (OLED), AMOLED, EL, an electrophoretic display (EPD), an electrochromic display (ECD), a liquid crystal display (LCD) and a Plasma display Panel (PDP).

The sensing unit 100 is located at the inner surface of the flexible display panel 700 so as to recognize an entity located inside of the flexible display panel 700. The sensing unit 100 may be implemented as an RFID reader and a biosensor.

As an embodiment, when the device 10 is mounted on an entity such as a tumbler, a cup, a bottle, a stand and a speaker, the sensing unit 100 can identify the entity by recognizing an RFID signal from a tag attached to the entity. Alternatively, the sensing unit 100 may recognize the entity through a unique signal of the entity.

As another embodiment, when the device 10 is worn on the user's body, for example, a wrist, the sensing unit 100 may recognize that the device 10 is worn on a human body according to a human biosignal, for example, pulse, heart rate and body temperature.

The mode selection unit 300 automatically selects an operation mode corresponding to the recognized entity.

Figure 6:
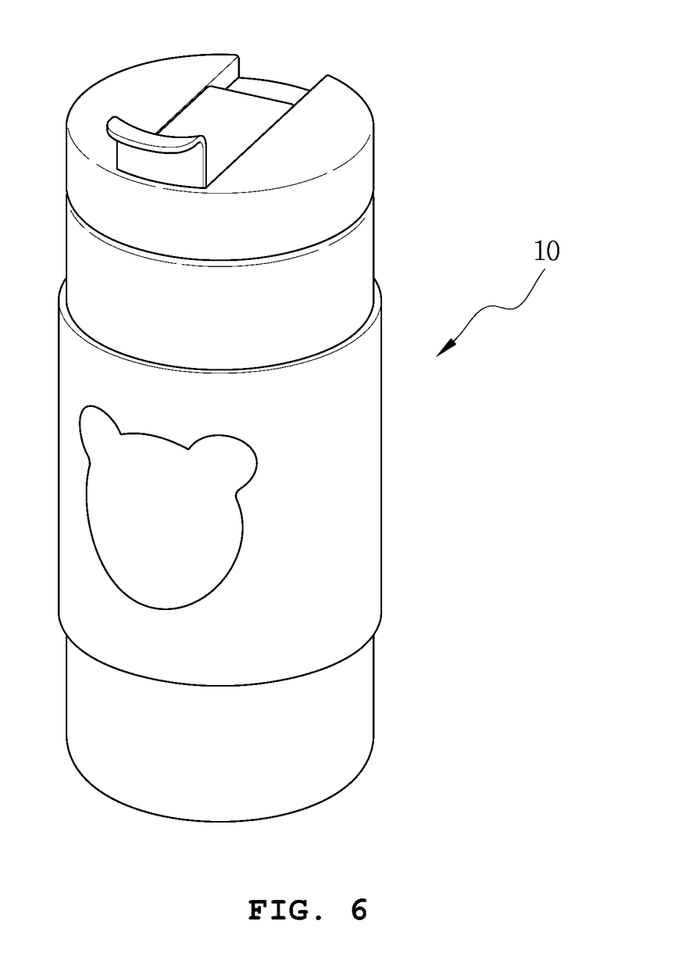
FIGS. 6 to 9 are examples of applications according to operation modes of the sleeve type smart device of FIG. 1.
Figure 7:
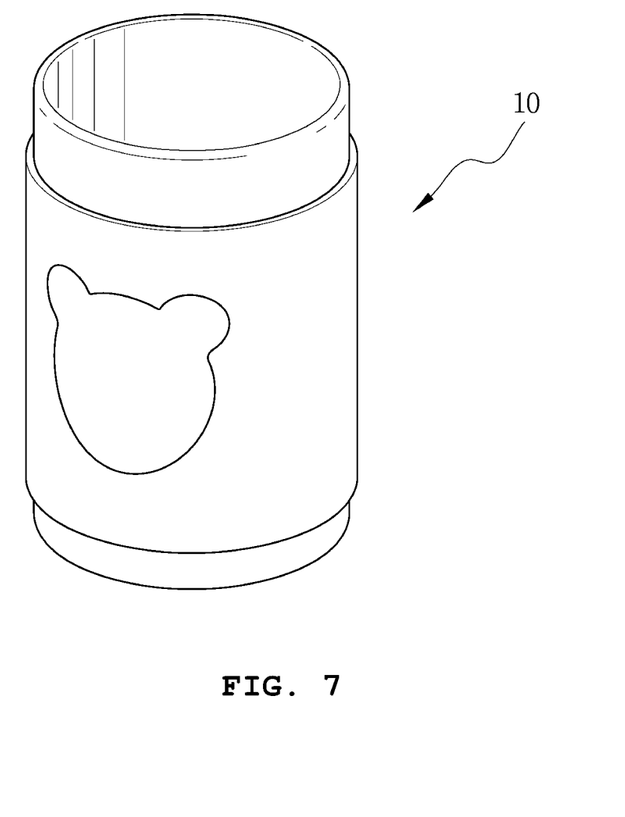
Figure 8:
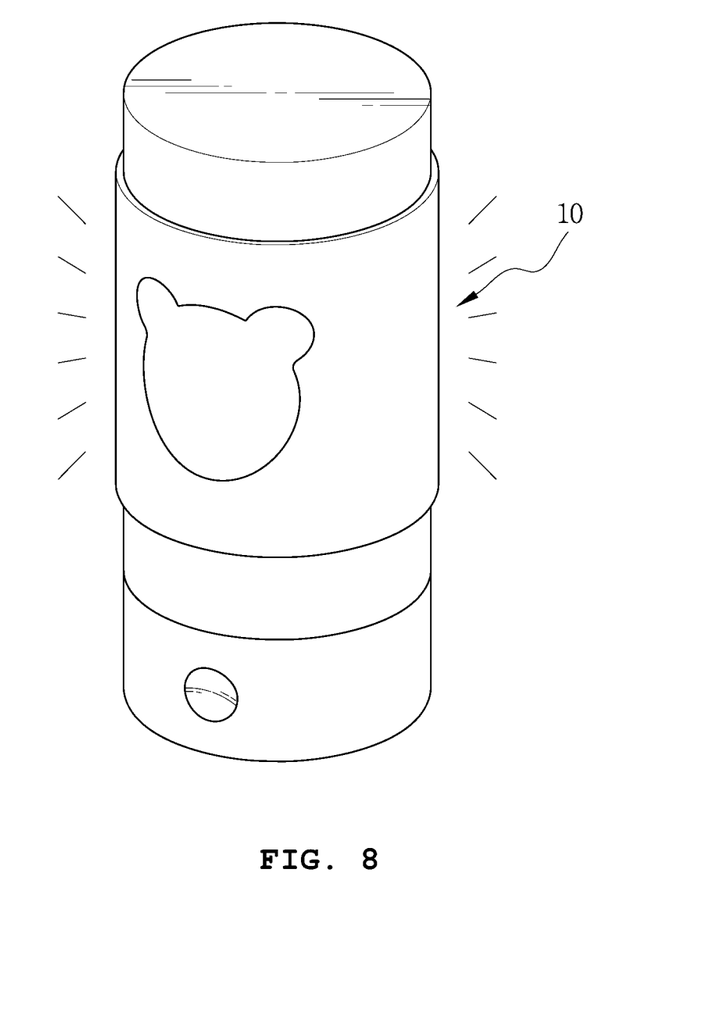

For example, referring to FIGS. 6 and 7, when the device 10 is mounted on a tumbler or a cup, the device 10 may act as a display device or perform a temperature-dependent color display operation. Additionally, when the device 10 is mounted on a stand as shown in FIG. 8, the device 10 may perform a function of a light stand.

As another embodiment, when the device 10 is mounted on an audio device, for example, MP3, the device 10 may act as a speaker.

Figure 9:
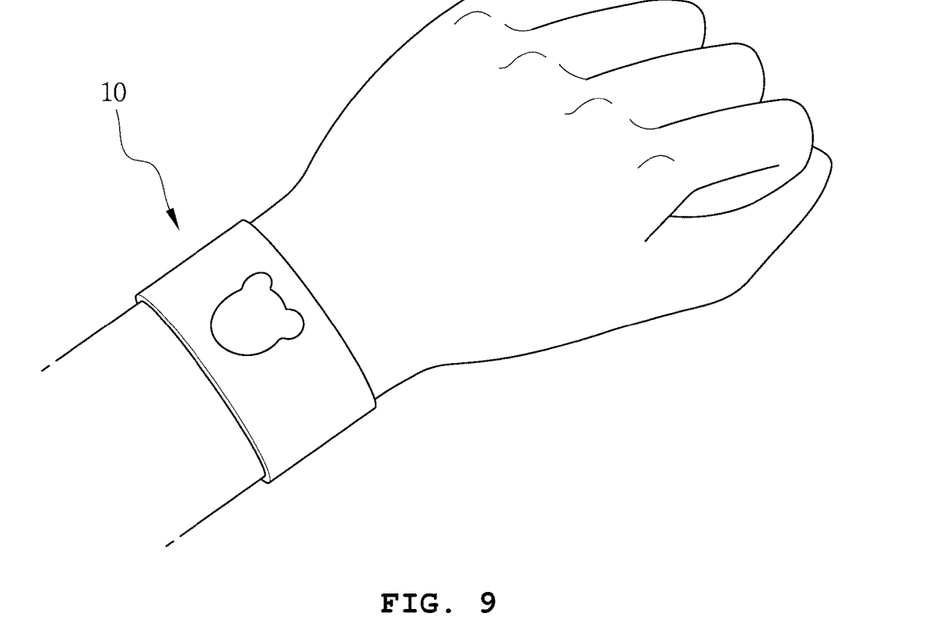

As still another example, referring to FIG. 9, when the device 10 is mounted on the user's wrist, the device 10 may act as a smart watch and a health band. In this case, the device 10 may not only measure the user's step counts and heart rate, but also perform a general watch display function.

The control unit 500 controls the device 10 to operate in the operation mode selected by the mode selection unit 300. As a mode that is best suited for the recognized entity is preset, the control unit 500 enables operation in the corresponding mode. The control unit 500 may control by working with the user's smartphone.

The control unit 500 may control to execute many contents according to each operation mode of the device 10.

Figure 10:
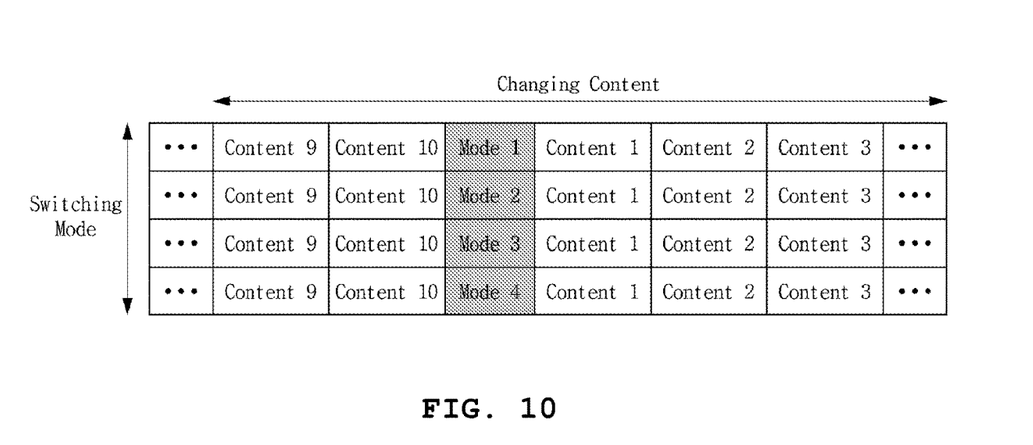
FIG. 10 is an example of a table for storing operation modes of the sleeve type smart device of FIG. 1 and contents of each operation mode.

Referring to FIG. 10, a plurality of contents 1 to 10 may be executed in Mode 1. For example, when the device 10 is mounted on a tumbler, a tumbler mode runs, and in this case, contents of a first image display and a second image display, a temperature-dependent color display and a temperature display may be executed.

Each operation mode and contents belonging to each operation mode may be stored in the form of a look-up table as shown in FIG. 10, and content change or mode switching may be made by interaction with the user.

The small cylindrical display naturally brings a situation in which the user holds in the hand and controls while seeing the screen according to the shape feature. Accordingly, there is a need for a method that controls the content displayed on the small cylindrical display held in the hand.

When the user uses the cylindrical display while holding it in the hand, in case that a touch method is used, a touch area of the display comes in two types; a grasping area and a control area, so there are difficulties in general touch control, and according to the characteristics of the small cylindrical display, there is a limitation that a natural touchable area is limited to a very narrow range due to high curvature of the screen to control.

Accordingly, an effective method is a method by which the cylindrical display is held in the hand and content within the device is controlled by moving the display itself, and this is a key UI of the small cylindrical display that can be used as, for example, a wearable device and a portable device, and is fundamental technology for interface and interaction design of the cylindrical display.

Figure 11:
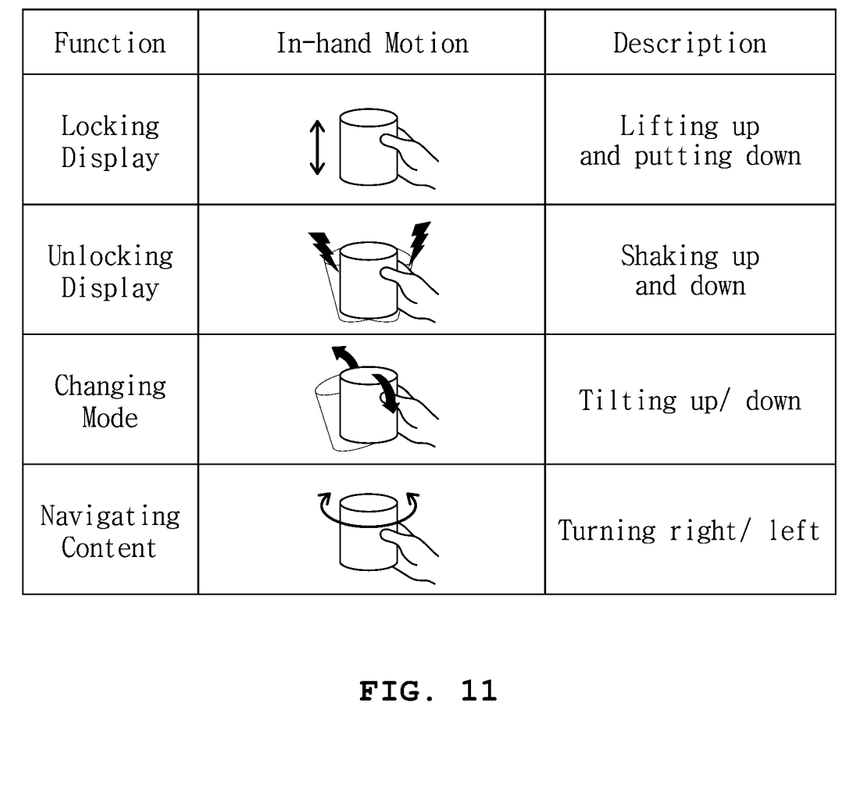
FIG. 11 is an example of interaction of the sleeve type smart device of FIG. 1.

Referring to FIG. 11, an example of an in-hand motion UI of the device 10 is shown, and lifting up and putting down the device 10 may lock the display on the flexible display panel 700 to prevent other content from being executed. On the contrary, shaking up and down the device 10 may unlock the display on the flexible display panel 700.

Additionally, tilting up and down the device 10 may switch the mode of the sleeve type smart device, and turning the device 10 right and left may navigate the content displayed on the flexible display panel.

The user's in-hand motion and functions corresponding to each motion are stored in the form of a look-up table as shown in FIG. 11, and when a specific motion is sensed, the control unit 500 may control the device 10 to perform the corresponding function.

However, the above-described motions and functions are for illustration only, and the motions and the corresponding functions may be changed or added as needed. Additionally, even a same motion may correspond to different functions depending on each operation mode. For example, in a tumbler mode, shaking up and down the device 10 may be a function to unlock the display on the flexible display panel 700, but in a light mode, may be a function to change light to a different color.

The device 10 according to the present disclosure is implemented in the shape of a sleeve, and recognizes an installation state and can be used in various applications according to the installation state. Accordingly, the user usually wears the device 10 as a wearable device, and when necessary, the device 10 may be mounted on another device and used as other devices, for example, a display, a speaker and a lamp, and thus it is convenient to carry with and can satisfy the user's various needs.

Figure 12:
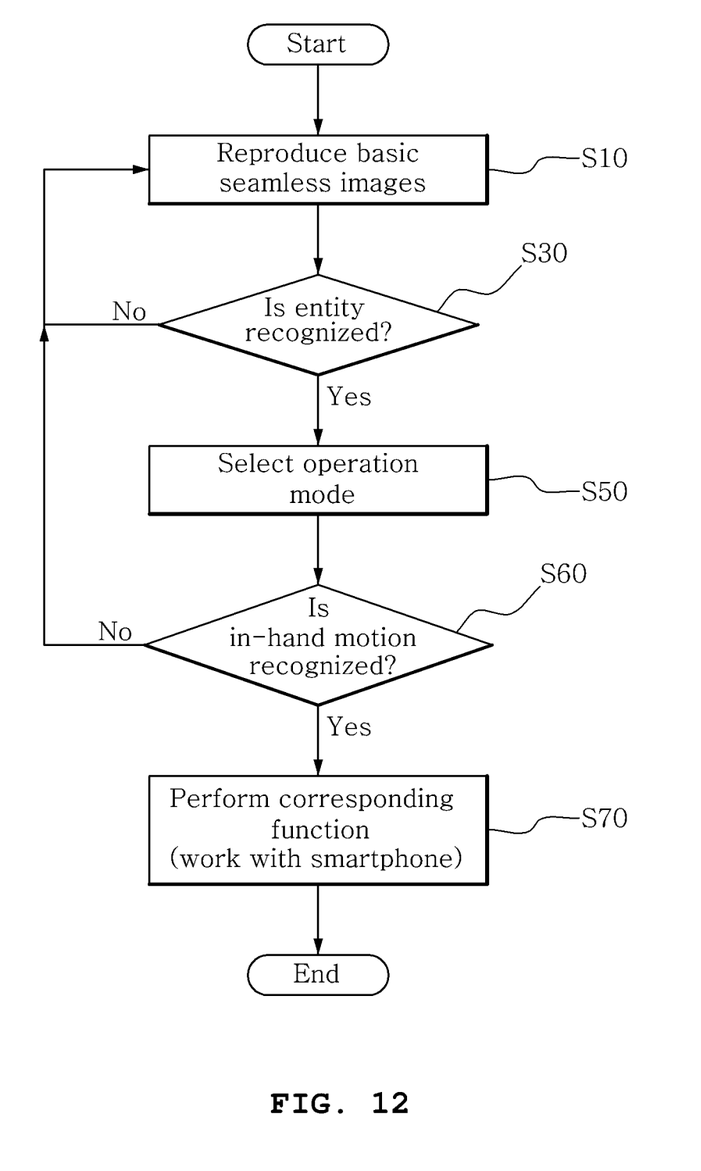
FIG. 12 is a flowchart of a method for controlling a sleeve type smart device according to an embodiment of the present disclosure.

FIG. 12 is a flowchart of a method for controlling a sleeve type smart device according to an embodiment of the present disclosure.

The method for controlling a sleeve type smart device according to this embodiment may be performed in substantially the same configuration as the device 10 of FIGS. 1 and 2. Accordingly, the same reference signs are given to the same elements as the device 10 of FIGS. 1 and 2, and a repeated description is omitted herein. Additionally, the method for controlling a sleeve type smart device according to this embodiment may be performed by the software (application) for controlling a sleeve type smart device.

Referring to FIG. 12, in the method for controlling a sleeve type smart device according to this embodiment, a seamless continuous image is displayed on the outer surface of the sleeve type smart device (S10). This image reproduction is a basic function that is performed without any special input or control when the sleeve type smart device is in ON state.

Subsequently, when an entity located inside the sleeve type smart device is recognized (S30), an operation mode corresponding to the recognized entity is automatically selected (S50).

As an embodiment, when the sleeve type smart device is mounted on the user's body, for example, a wrist, it may be recognized as being worn on a human body according to a human biosignal, for example, pulse, heart rate and body temperature. Additionally, when the entity is a human body, a preset operation mode, for example, a smart watch and a health band, may be selected.

As another embodiment, when the sleeve type smart device is mounted on an entity, for example, a tumbler, a cup, a bottle, a stand and a speaker, the entity may be identified by recognizing an RFID signal from a tag attached to the entity. Alternatively, the entity may be recognized through a unique signal of the entity. Additionally, an operation mode preset to each entity may be selected.

For example, a preset operation mode, for example, a tumbler mode, a cup mode, a bottle mode, a stand mode and a speaker mode may immediately run, and a function corresponding to the preset operation mode may be preset.

Additionally, an in-hand motion of the sleeve type smart device is sensed (S60), and a function corresponding to the in-hand motion may be performed (S70).

For example, in case that the sleeve type smart device operates in a smart watch mode, when a walking motion is recognized from the device afterward, a pedometer function to count steps may be performed. Alternatively, when the sleeve type smart device operates in a tumbler mode, in response to lifting up and putting down the sleeve type smart device, a function to lock the display on the flexible display panel may be performed, and in response to shaking up and down the sleeve type smart device, a function to unlock the display on the flexible display panel may be performed.

The method for controlling a sleeve type smart device as described above may be implemented as an application or in the form of program commands that are executed through various computer components, and recorded in computer-readable recording media. The computer-readable recording media may include program commands, data files and data structures, alone or in combination.

The program commands in recorded in the computer-readable recording media may be specially designed and configured for the present disclosure and may be those known and available to those having ordinary skill in the field of computer software.

Examples of the computer-readable recording media include magnetic media such as hard disk, floppy disk and magnetic tape, optical recording media such as CD-ROM and DVD, magneto-optical media such as floptical disk, and hardware devices specially designed to store and execute program commands such as ROM, RAM and flash memory.

Examples of the program commands include machine codes generated by a compiler as well as high-level language codes that can be executed by a computer using an interpreter. The hardware device may be configured to act as one or more software modules to perform the operation according to the present disclosure, or vice versa.

While the present disclosure has been hereinabove described with reference to the embodiments, those having ordinary skill in the corresponding technical field will understand that various modifications and changes may be made to the present disclosure without departing from the spirit and scope of the present disclosure set forth in the appended claims.

INDUSTRIAL APPLICABILITY

The present disclosure can utilize a cylindrical outer surface itself as a display by use of a flexible display, and efficiently represent 3D stereoscopic image that can be seen in 360-degree full screen according to the cylindrical shape property. This can be used as a totally new type of key platform for content production and reproduction, and particularly, when it is manufactured in a cylindrical sleeve-shaped form of which the inside is empty, it can be used as a key device of IoT technology that can be used while mounted on a wrist as well as various cylindrical objects (e.g., a cup, a tumbler, a light stand, etc.).

What is claimed is:

1. A smart device, comprising:
a cylindrical flexible display panel which displays seamless continuous images on an outer surface thereof, and has a sleeve-shaped form with an inside that is empty;
a sensing unit located at an inner surface of the flexible display panel so as to recognize an entity located inside the flexible display panel;
a mode selection unit for automatically selecting an operation mode corresponding to the recognized entity; and
a control unit for controlling so as to operate in the operation mode selected by the mode selection unit;
wherein
the control unit senses an in-hand motion of the smart device in the selected operation mode, and controls the smart device to perform a function corresponding to the in-hand motion, and
the control unit locks a display on the flexible display panel in response to lifting up and putting down of the smart device,
unlocks the display on the flexible display panel in response to shaking up and down of the smart device,
switches the operation mode of the smart device in response to tilting up and down of the smart device, and
navigates content displayed on the flexible display panel in response to turning right and left of the smart device.

2. The smart device according to claim 1, wherein the sensing unit recognizes an RFID signal from a tag attached to the entity located inside the flexible display panel, or recognizes a human biosignal.

3. The smart device according to claim 2, wherein the entity located inside the flexible display panel is at least one of a tumbler, a cup, a bottle, a stand, a speaker or a human body part.

4. The smart device according to claim 1, wherein the mode selection unit selects a preset operation mode according to the recognized entity.

5. The smart device according to claim 4, wherein the mode selection unit selects one of a smart watch mode or a health band mode when the recognized entity is a human body part.

6. The smart device according to claim 1, wherein the control unit stores each operation mode and at least one content that can be executed in each operation mode.

7. The smart device according to claim 6, wherein the control unit stores in hand motions corresponding to each content.

8. A method for controlling a smart device which displays seamless continuous images on an outer surface and has a sleeve-shaped form with an inside that is empty, the method comprising:
recognizing an entity located inside the smart device;
automatically selecting an operation mode corresponding to the recognized entity; and
controlling the smart device to operate in the operation mode selected by the mode selection unit;
wherein the controlling the smart device comprises:
sensing an in-hand motion of the smart device in the selected operation mode; and
controlling the smart device to perform a function corresponding to the in-hand motion; and
wherein the controlling the smart device to perform the function corresponding to the in-hand motion comprises:
locking a display on the outer surface in response to lifting up and putting down of the smart device,
unlocking the display on the outer surface in response to shaking up and down of the smart device,
switching the operation mode of the smart device in response to tilting up and down of the smart device, and
navigating content displayed on the outer surface in response to turning right and left of the smart device.

9. The method for controlling the smart device according to claim 8, wherein the recognizing the entity located inside the smart device comprises recognizing an RFID signal from a tag attached to the entity located inside the smart device, or recognizing the entity according to a human biosignal.

10. The method for controlling the smart device according to claim 8, wherein the entity located inside the smart device is at least one of a tumbler, a cup, a bottle, a stand, a speaker or a human body part.

11. The method for controlling the smart device according to claim 8, wherein the automatically selecting the operation mode corresponding to the recognized entity comprises selecting a preset operation mode according to the recognized entity.

12. The method for controlling the smart device according to claim 11, wherein the automatically selecting the operation mode corresponding to the recognized entity comprises selecting one of a smart watch mode or a health band mode when the recognized entity is a human body part.

13. A computer-readable recording medium having recorded thereon a computer program for implementing the method for controlling the smart device according to claim 8.

* * * * *